United States Patent
Ohara

(10) Patent No.: US 11,516,753 B2
(45) Date of Patent: Nov. 29, 2022

(54) USER EQUIPMENT AND BASE STATION APPARATUS

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/050,611

(22) PCT Filed: May 18, 2018

(86) PCT No.: PCT/JP2018/019416
§ 371 (c)(1),
(2) Date: Oct. 26, 2020

(87) PCT Pub. No.: WO2019/220650
PCT Pub. Date: Nov. 21, 2019

(65) Prior Publication Data
US 2021/0120504 A1  Apr. 22, 2021

(51) Int. Cl.
*H04W 52/36* (2009.01)
*H04W 52/42* (2009.01)
(Continued)

(52) U.S. Cl.
CPC ............ *H04W 52/36* (2013.01); *H04W 52/42* (2013.01); *H04W 74/0833* (2013.01); *H04W 80/02* (2013.01)

(58) Field of Classification Search
CPC ..... H04W 52/36; H04W 52/42; H04W 52/50; H04W 52/146; H04W 52/362;
(Continued)

(56) References Cited

U.S. PATENT DOCUMENTS

2016/0100434 A1  4/2016  Chen et al.
2016/0278130 A1*  9/2016  Uchino ................ H04W 52/38
(Continued)

FOREIGN PATENT DOCUMENTS

EP  3 200 514 A1  8/2017
JP  2016-066944 A  4/2016
(Continued)

OTHER PUBLICATIONS

Office Action issued in the counterpart Japanese Patent Application No. 2020-518945, dated Oct. 5, 2021 (8 pages).
(Continued)

*Primary Examiner* — Jianye Wu
(74) *Attorney, Agent, or Firm* — Osha Bergman Watanabe & Burton LLP

(57) ABSTRACT

User equipment includes a transmission unit that performs uplink transmissions to a base station apparatus via a plurality of uplink carriers; and a control unit that changes a transmission power value of a random access channel to be transmitted with one or more of the plurality of uplink carriers when priority levels are assigned to the respective uplink transmissions on the plurality of uplink carriers; wherein, when the transmission unit fails to transmit a random access preamble with the transmission power value of the random access channel that is changed by the control unit and the transmission unit retransmits a random access preamble, the control unit changes transmission power control of the random access preamble to be transmitted from normal transmission power control.

7 Claims, 7 Drawing Sheets

(51) Int. Cl.
*H04W 74/08* (2009.01)
*H04W 80/02* (2009.01)

(58) Field of Classification Search
CPC .............. H04W 52/367; H04W 52/48; H04W 74/0833; H04W 74/004; H04W 80/02
See application file for complete search history.

(56) References Cited

U.S. PATENT DOCUMENTS

2017/0303212 A1   10/2017   Takeda et al.
2019/0200375 A1*   6/2019   Yasukawa ............. H04W 72/02

FOREIGN PATENT DOCUMENTS

| WO | 2015/064515 A1 | 5/2015 |
| WO | 2018/030396 A1 | 2/2018 |

OTHER PUBLICATIONS

International Search Report issued in Application No. PCT/JP2018/019416, dated Jul. 3, 2018 (5 pages).
Written Opinion issued in International Application No. PCT/JP2018/019416, dated Jul. 3, 2018 (3 pages).
3GPP TS 38.211 V15.1.0, Release 15; "3rd Generation Partnership Project; Technical Specification Group Radio Access Network; NR; Physical channels and modulation;" Mar. 2018; Sophia Antipolis Valbonne, France (90 pages).
3GPP TS 37.340 V15.1.0, Release 15; "3rd Generation Partnership Project; Technical Specification Group Radio Access Network; Evolved Universal Terrestrial Radio Access (E-UTRA) and NR; Multi-connectivity; Stage 2;" Mar. 2018; Sophia Antipolis Valbonne, France (52 pages).
3GPP TS 38.300 V15.1.0, Release 15; "3rd Generation Partnership Project; Technical Specification Group Radio Access Network; NR; NR and NG-RAN Overall Description; Stage 2;" Mar. 2018; Sophia Antipolis Valbonne, France (71 pages).
Extended European Search Report in counterpart European Application No. 18 91 9182.8 dated Nov. 22, 2021 (10 pages).
H. Huawei et al; "Remaining issues on RA procedure"; 3GPP TSG-RAN WG2 Ad Hoc, R2-1800995; Vancouver, Canada; Jan. 22-26, 2018 (5 pages).
Office Action issued in the counterpart Japanese Patent Application No. 2020-518945, dated Mar. 8, 2022 (5 pages).
Decision of Refusal in counterpart Japanese Patent Application No. 2020-518945 dated Aug. 2, 2022 (3 pages).
Decision of Dismissal of Amendment in counterpart Japanese Patent Application No. 2020-518945 dated Aug. 2, 2022 (6 pages).
Office Action issued in Canadian Application No. 3098982 dated Sep. 12, 2022 (4 pages).

* cited by examiner

USER EQUIPMENT AND BASE STATION APPARATUS

TECHNICAL FIELD

The present invention relates to a user equipment and a base station apparatus in a wireless communication system.

BACKGROUND ART

In the 3rd Generation Partnership Project (3GPP), a radio communication method called 5G or New Radio (NR) (the radio communication method is referred to as "5G" or "NR" below) has been studied in order to achieve a further increase in system capacity, a further increase in a data transmission rate, and a further reduction in latency in a radio section. For 5G, a variety of wireless techniques have been studied in order to meet a requirement of achieving a throughput higher than or equal to 10 Gbps while reducing latency in a radio section to be less than or equal to 1 ms.

For NR, a radio communication using a millimeter wave has been studied, and use of broad frequencies up to a frequency band much higher than that used in Long Term Evolution (LTE) is expected. In particular, since propagation losses increase in high frequency bands, application of beamforming with a narrow beam width has been studied so as to compensate for the propagation losses (e.g., Non-Patent Document 1).

Furthermore, in the NR system, introduction of a technique called LTE-NR dual connectivity or multi-RAT (Multi Radio Access Technology) dual connectivity has been studied, in which, similar to the dual connectivity in the LTE system, data is divided between a base station apparatus (eNB) in the LTE system and a base station apparatus (gNB) in the NR system, and the data is simultaneously communicated by these base stations (e.g., Non-Patent Document 2).

Furthermore, in the NR system, introduction of supplementary uplink (SUL) has been studied. This technique allows switching of two carriers, normal UL and SUL, to carry out UL transmission on either one of the carriers (e.g., Non-Patent Document 3). As an example, normal UL is assigned to a high frequency band and SUL is assigned to a low frequency band.

PRIOR ART DOCUMENT

Non-Patent Document

Non-Patent Document 1: 3GPP TS 38.211 V15.1.0 (2018 March)
Non-Patent Document 2: 3GPP TS 37.340 V15.1.0 (2018 March)
Non-Patent Document 3: 3GPP TS 38.300 V15.1.0 (2018 March)

SUMMARY OF THE INVENTION

Problem to be Solved by the Invention

During NR random access, in a case of carrier aggregation, in a case of using two UL carriers, or in a case of dual connectivity, if a total of transmission power of PRACH (Physical random access channel) and transmission power of another channel reaches a maximum transmission power, transmission power of a random access preamble may be unable to be set appropriately.

The present invention has been accomplished in view of the above-described point, and an object is to set appropriate transmission power for a random access preamble when user equipment performs random access.

Means for Solving the Problem

According to the disclosed technique, there is provided user equipment including a transmission unit that performs uplink transmissions to a base station apparatus via a plurality of uplink carriers; and a control unit that changes a transmission power value of a random access channel to be transmitted with one or more of the plurality of uplink carriers when priority levels are assigned to the respective uplink transmissions on the plurality of uplink carriers; wherein, when the transmission unit fails to transmit a random access preamble with the transmission power value of the random access channel that is changed by the control unit and the transmission unit retransmits a random access preamble, the control unit changes transmission power control of the random access preamble to be transmitted from normal transmission power control.

Advantage of the Invention

According to the disclosed technique, when user equipment performs random access, appropriate transmission power can be set for a random access preamble.

EMBODIMENTS OF THE INVENTION

Figure 1:
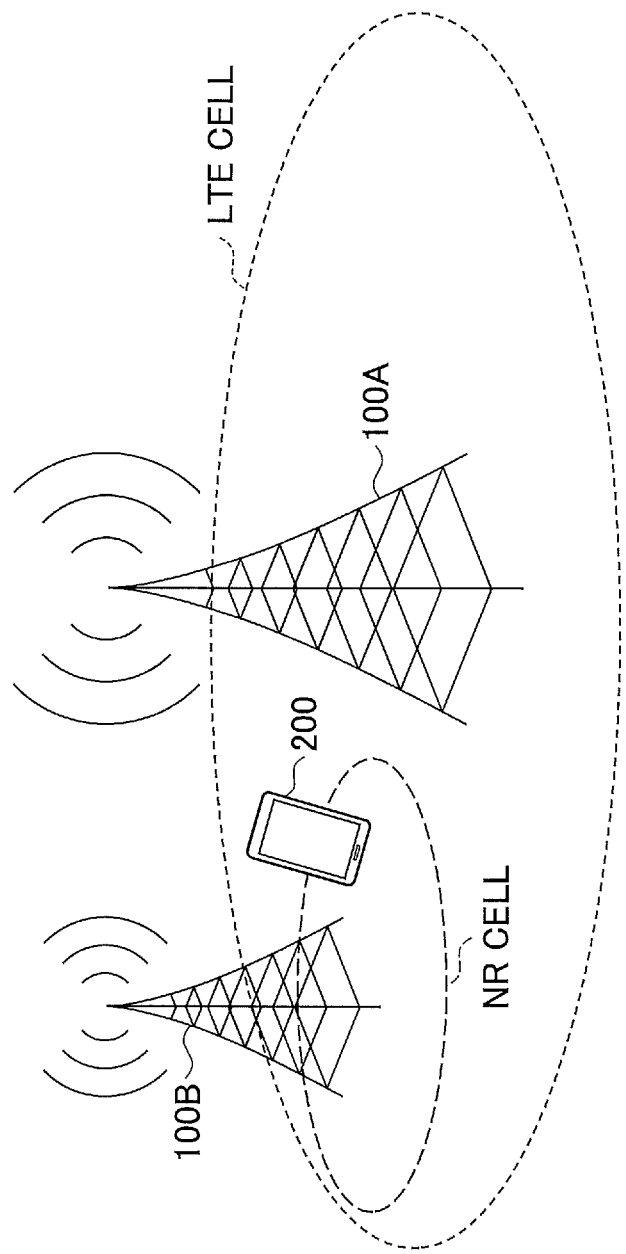
FIG. 1 is a diagram illustrating an exemplary configuration of a wireless communication system in an embodiment of the present invention.

In the following, embodiments of the present invention are described with reference to the drawings. It should be noted that the embodiments described below are merely an example, and embodiments to which the present invention can be applied are not limited to the following embodiments.

For operations of a wireless communication system in the embodiments of the present invention, an existing technique is used as appropriate. However, the existing technique may be, but is not limited to, the existing LTE, for example.

Unless otherwise specified, the term "LTE" as used herein should be construed as having a broad meaning including LTE-Advanced and schemes after LTE-Advanced (e.g., NR or 5G).

Further, in the embodiments of the present invention described below, terms used in the existing LTE such as synchronization signal (SS), primary SS (PSS), secondary SS (SSS), physical broadcast channel (PBCH), physical RACH (PRACH), downlink (DL), and uplink (UL) are used. However, these terms are used for the sake of convenience and different terms may be used to describe signals and functions similar to those mentioned above.

Furthermore, in the embodiments of the present invention, a duplex method may be a time division duplex (TDD) method, a frequency division duplex (FDD) method or any other method (e.g., flexible duplex). Further, in the following description, transmitting a signal using a transmission beam may be transmitting a signal multiplied by a precoding vector (pre-coded with a precoding vector). Similarly, receiving a signal using a reception beam may be multiplying a received signal with a predetermined weighted vector. Further, transmitting a signal using a transmission beam may be expressed as transmitting a signal with a specific antenna port. Similarly, receiving a signal using a reception beam may be expressed as receiving a signal with a specific antenna port. An antenna port refers to a logical antenna port or a physical antenna port specified in the 3GPP specifications.

Methods for forming transmission and reception beams are not limited to the above-mentioned methods. For example, when there are a base station apparatus and a user equipment each having a plurality of antennas, a method of changing the angle of each antenna may be used, a combination of a method of using a precoding vector and the method of changing antenna angles may be used, different antenna panels may be switched and used, a method of using a combination of a plurality of antenna panels may be used, or any other method may be used. Furthermore, a plurality of different transmission beams may be used in a high frequency band. Using a plurality of transmission beams is referred to as a multi-beam operation and using one transmission beam is referred to as a single-beam operation.

Further, in the embodiments of the present invention, "configuring" wireless parameters and the like may be pre-configuring or specifying predetermined values or may be configuring wireless parameters reported from a base station apparatus 100 or a user equipment 200.

FIG. 1 is a diagram for illustrating a communication system in an embodiment of the present invention. As illustrated in FIG. 1, the wireless communication system in the embodiment of the present invention includes a base station apparatus 100 and a user equipment 200. Although FIG. 1 shows two base station apparatuses 100 and one user equipment 200, this is merely an example and the communication system may comprise more than two base station apparatuses 100 and more than one user equipment 200.

Each of the base station apparatuses 100 is a communication device that provides one or more cells and communicates with the user equipment 200 wirelessly. For example, as shown in FIG. 1, the base station apparatus 100A provides an LTE cell and the base station apparatus 100B provides an NR cell (when there is no need to distinguish the base station apparatuses from one another, they are referred to as the "base station apparatuses 100" below). The base station apparatus 100A may be referred to as eNB and the base station apparatus 100B may be referred to as gNB.

The base station apparatus 100B is a communication device that provides one or more NR cells and carries out NR wireless communication with the user equipment 200. When the base station apparatus 100B carries out NR communication with the user equipment 200, dual connectivity (DC) may be used to allow the base station apparatus 100A and the base station apparatus 100B to communicate with the user equipment 200 in parallel. Each of the base station apparatus 100B and the user equipment 200 may transmit and receive signals by beamforming.

The user equipment 200 is a communication device with a wireless communication capability, such as a smart phone, a mobile phone, a tablet, a wearable terminal, or a machine-to-machine (M2M) communication module, which can be connected to the base station apparatus 100A or 100B wirelessly and use a variety of communication services provided by the wireless communication system. At the time of an initial access or when returning to a wireless connection, the user equipment 200 sends a random access preamble signal to the base station apparatus 100 to start a random access procedure. The random access is performed based on broadcast information received from the base station apparatus 100 using the physical downlink shared channel (PDSCH), in addition to broadcast information received using the PBCH. The user equipment 200 can start a connection to the base station apparatus 100B based on information obtained from the base station apparatus 100A. Further, the user equipment 200 may start a connection to the base station apparatus 100B based on information obtained from the base station apparatus 100B without having a connection to the base station apparatus 100A.

It should be noted that the base station apparatus 100A may provide a NR cell and the user equipment 200 may communicate with the base station apparatuses 100A and 100B using NR-NR dual connectivity. Further, as a stand-alone form, the user equipment 200 may communicate with one base station apparatus 100 through a NR cell. Further, the base station apparatus 100 may communicate with the user equipment 200 using carrier aggregation through a plurality of carriers. Further, the base station apparatus 100 may use supplementary uplink (SUL) to communicate with the user equipment 200 through two uplink (UL) carriers with a single cell.

Here, when using carrier aggregation, using two UL carriers with a single cell or using a plurality of UL carriers such as in the case of dual connectivity, and a total of transmission power transmitted on the respective UL carriers in a certain transmission period such as the physical uplink shared channel (PUSCH), the physical uplink control channel (PUCCH), the physical random access channel (PRACH), or the sounding reference signal (SRS), exceeds the maximum transmission power of the user equipment 200 in the certain transmission period, it is specified that priority levels are assigned to the respective channel transmissions by taking the cell types into consideration to prevent the total of transmission power from exceeding the maximum transmission power. It should be noted that "using two UL carriers with a single cell" refers to using two UL carriers, such as normal UL and SUL, for example.

The maximum transmission power of the user equipment 200 may be specified per user equipment 200 in advance by specifications or the user equipment 200 may be notified of it through a network. The "maximum transmission power in the certain period" based on the maximum transmission power may be specified by specifications or may be determined by the user equipment 200 based on a notification from the network.

The carrier aggregation or two UL carriers described above may be included in the primary cell group (PCG) or may be included in the secondary cell group (SCG) when using dual connectivity.

In the case of dual connectivity, such as LTE-NR, NR-NR or the like, setting priority levels as described above may be applied to PCell and PSCell or to PCell and SCell in the primary cell group or the secondary cell group.

Figure 2:
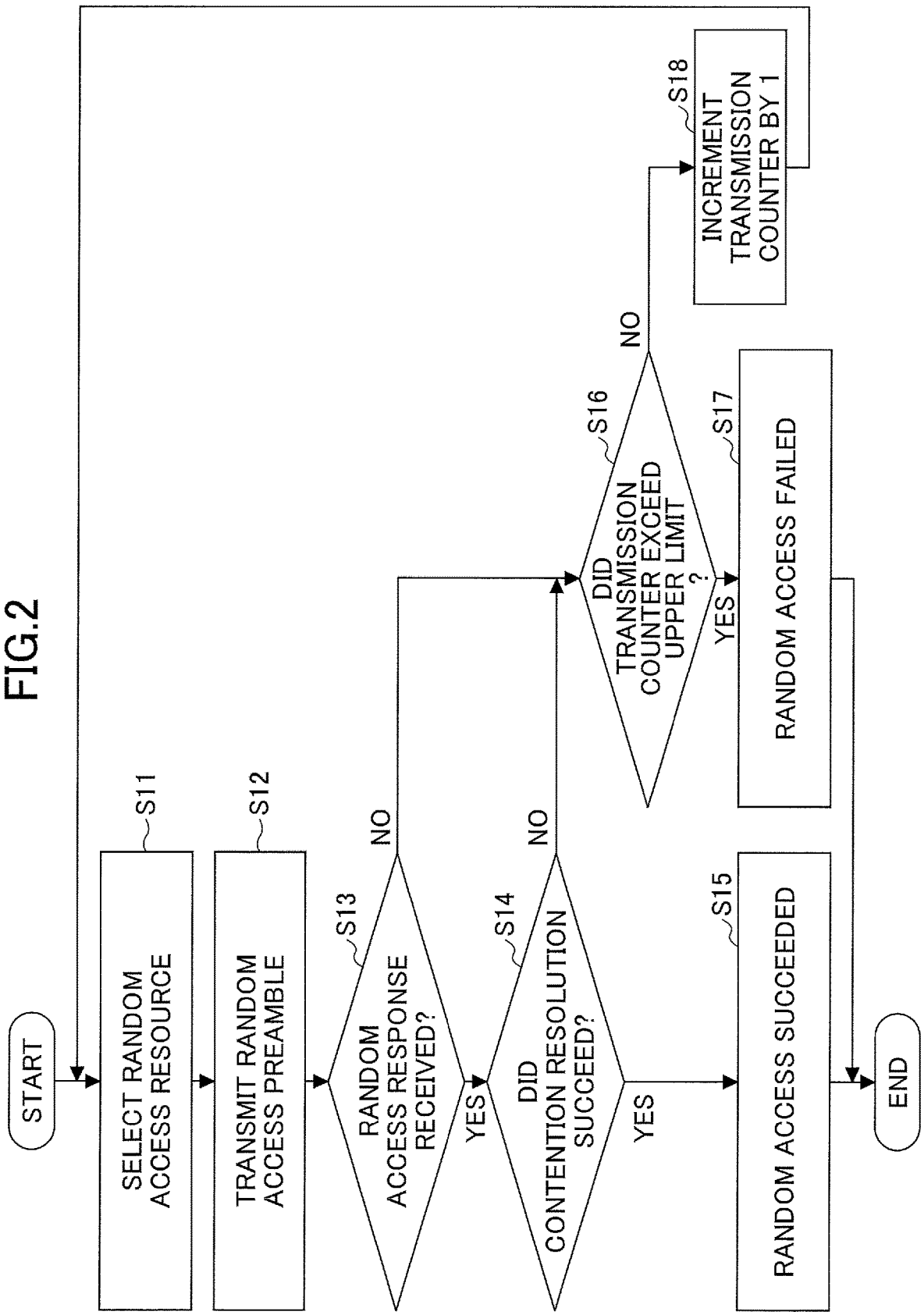
FIG. 2 is a flowchart for illustrating an example of a random access procedure in an embodiment of the present invention.

FIG. 2 is a flowchart for illustrating an example of a random access procedure in the embodiment of the present invention. FIG. 2 shows an exemplary random access procedure. The base station apparatus 100 transmits PSS, SSS, and PBCH to the user equipment 200. PBCH includes part of system information. At the start of the random access procedure, a transmission counter is set to "1".

At step S11, the user equipment 200 selects resources used for a random access, i.e., RACH resources specified by the frequency domain and the time domain used for performing the random access procedure, based on information received from the base station apparatus 100 and specifying a preamble format or the like. Next, the user equipment 200 transmits a random access preamble using the selected resources (S12). The configuration of random access preamble transmission power is described below.

At step S13, the base station apparatus 100 transmits a random access response to the user equipment 200. A random access response is a response to the random access preamble and is sent to a random access-radio network temporary identifier (RA-RNTI) using the PDCCH, and PDSCH scheduled using the PDCCH at least includes a random access preamble identifier, timing alignment, an initial uplink grant and a temporary cell-radio network temporary identifier (temporary C-RNTI). When the user equipment 200 receives the random access response (YES at S13), the process advances to step S14. When the user equipment 200 receives no random access response (No at S13), the process advances to step S16.

At step S14, the user equipment 200 performs uplink transmission based on an uplink grant included in the random access response. In the uplink transmission, at least a radio resource control (RRC) connection request and a non-access stratum (NAS) user equipment (UE) identifier are transmitted. Next, a message used for contention resolution and addressed to a temporary C-RNTI or C-RNTI is transmitted using the PDCCH from the base station apparatus 100 to the user equipment 200, and PDSCH scheduled using the PDCCH at least includes control information for RRC connection establishment and a predetermined medium access control (MAC) control element sent from the user equipment 200 at step S14. The MAC control element is used in contention resolution. It should be noted that contention resolution (step S14) may be carried out when a contention based random access procedure is performed and may not be performed when performing a non-contention based random access procedure. When the user equipment 200 determines that the MAC control element matches with part of or all of the data sent at step S14 (YES at step S14), the process advances to step S15. If the MAC control element does not match (No at S14), the process advances to step S16.

At step S15, the user equipment 200 determines that the random access is successful, and when using a temporary C-RNTI, changes the temporary C-RNTI to C-RNTI to end the random access procedure.

At step S16, the user equipment 200 determines whether the transmission counter exceeds an upper limit which is set in advance or sent to the user equipment 200. When the counter exceeds the upper limit (YES at S16), the process advances to step S17, and if the upper limit is not exceeded (NO at S16), the process advances to step S18.

At step S17, the user equipment 200 determines that the random access has failed and ends the random access procedure. At step S18, the user equipment 200 increments the transmission counter by 1. The process returns to step S11 to retransmit a random access preamble and the user equipment 200 selects random access resources again.

Figure 3:
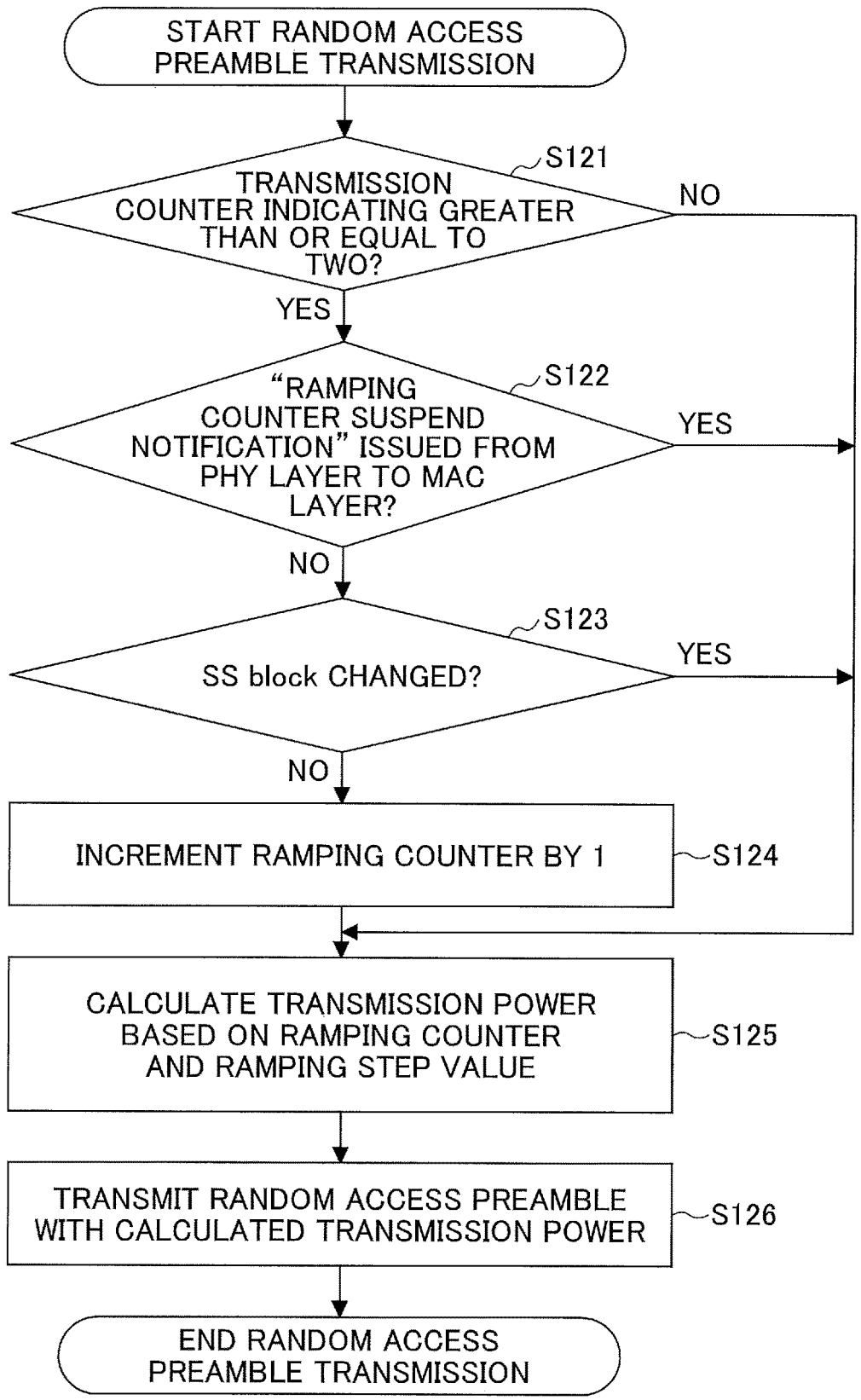
FIG. 3 is a flowchart for illustrating an example of a preamble transmission procedure in an embodiment of the present invention.

FIG. 3 is a flowchart for illustrating an example of a preamble transmission procedure in the embodiment of the present invention. With reference to FIG. 3, the random access preamble transmission performed at step S12 in FIG. 2 is described in detail. It should be noted that a ramping counter is set to "1" at the start of the random access procedure.

At step S121, the user equipment 200 determines whether the transmission counter is greater than or equal to two. That is, it is determined whether the random access preamble transmission is performed for the second time or later. When the transmission counter is greater than or equal to two (YES at S121), the process advances to step S122, and when the transmission counter is less than two (No at S121), the process advances to step S125.

At step S122, the user equipment 200 determines whether a "ramping counter suspend notification" is issued from the PHY layer to the MAC layer. If it is not issued (NO at S122), the process advances to step S123, and if it is issued (YES at S122), the process advances to step S125.

At step S123, the user equipment 200 determines whether the SS block has been changed from the SS block used in the previous preamble transmission. If no change has been made (NO at S123), the process advances to step S124. If a change has been made, the process advances to step S125 (YES at step S123).

At step S124, the user equipment 200 increments the ramping counter by 1.

At step S125, the user equipment 200 calculates random access preamble transmission power based on the ramping counter and a ramping step value. Here, the user equipment 200 may calculate the random access preamble transmission power based on a value obtained from subtracting 1 from the ramping counter value and multiplying the subtracted ramping counter value with the ramping step value. That is, when performing random access preamble transmission for the first time, transmission power is not ramped up, and when performing random access preamble transmission for the second time or later, transmission power is increased by the ramping step value. Next, the user equipment 200 sends a random access preamble with the calculated transmission power (S126).

Here, when using carrier aggregation, using two UL carriers with a single cell, or using a plurality of UL carriers such as in the case of dual connectivity, and a total of transmission power in a certain transmission period, such as PUSCH, PUCCH, PRACH, or SRS, exceeds the maximum transmission power of the user equipment 200 in the certain transmission period, priority levels may be assigned to the respective channel transmissions to prevent the total of transmission power from exceeding the maximum transmission power. Hereinafter, a case where such a control is performed is referred to as "CASE A". When "CASE A" takes place, control is to be performed such that transmission power for a channel with a low priority is reduced or no transmission is performed. For example, PRACH transmission for a cell other than PCell may have a lower priority than PRACH or PUCCH transmission for PCell. When the transmission period of PRACH transmission for a cell other than PCell overlaps with the transmission period of PRACH or PUCCH transmission for PCell, transmission power for PRACH transmission for a cell other than PCell may be restricted or the PRACH transmission may not be carried out. When using a plurality of UL carriers and priority levels are assigned to transmissions on the respective UL carriers, regardless of the total maximum power, PRACH transmission power may be reduced or the PRACH transmission may not be performed for any of the UL carriers. That is, "CASE A" may include "when using a plurality of UL carriers, priority levels are assigned to transmissions on the respective UL carriers."

Even when PRACH transmission power is restricted or the transmission itself was not performed due to "CASE A", in the upper layers, PREAMBLE_POWER_RAMPING COUNTER in the Media Access Control (MAC) layer is incremented by 1 due to the PRACH transmission being triggered. However, when retransmitting PRACH at the next time, "CASE A" may not take place or power may be less restricted even if "CASE A" takes place. When transmission power is ramped up based on PRACH transmission power that was not actually transmitted due to the PRACH transmission power being restricted or the transmission not being carried out, the transmission power may increase more than necessary and could cause an increase in interference to the environment.

Further, PREAMBLE_TRANSMISSION_COUNTER in the MAC layer is incremented by 1 due to PRACH transmission being performed. The number of times the user equipment 200 retransmits PRACH is limited only to the maximum number sent to the user equipment 200 from the base station apparatus 100 based on the counter; thus, even when PRACH transmission power is restricted or the transmission itself was not performed due to "CASE A" being applied at all times, the number of times the user equipment 200 attempts to carry out retransmission could reach the maximum number. Starting the random access procedure takes more time than preamble retransmission, so that delay associated with random access could increase.

Thus, a procedure of new power control performed mainly at step S125 when transmitting a random access preamble using NR-PRACH is described with reference to FIGS. 4 and 5.

Figure 4:
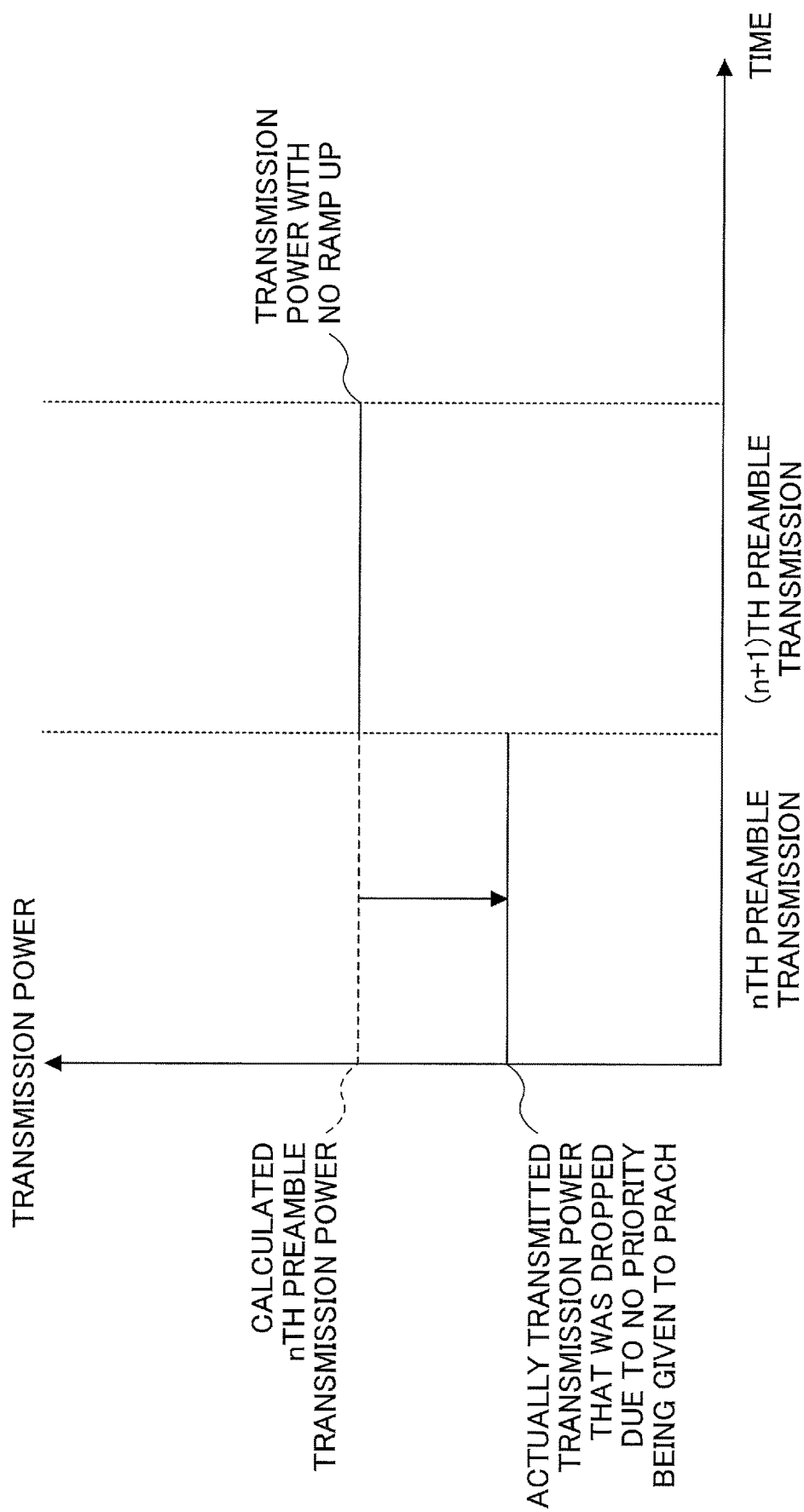
FIG. 4 is a diagram for illustrating Example (1) of preamble transmission power in an embodiment of the present invention.

FIG. 4 is a diagram illustrating Example (1) of preamble transmission power in the embodiment of the present invention. When the user equipment 200 transmits a random access preamble using NR-PRACH with PRACH transmission power that is dropped due to "CASE A", the user equipment 200 suspends power ramping when retransmitting a random access preamble using NR-PRACH.

As illustrated in FIG. 4, when preforming preamble transmission for the nth time, it is assumed that transmission power actually transmitted is reduced due to "CASE A" from transmission power calculated for the nth preamble transmission. Here, when the nth preamble transmission fails, (n+1)-th preamble transmission may be performed with the transmission power calculated for the nth preamble transmission while suspending power ramping.

When the user equipment 200 transmits a preamble with PRACH transmission power that is restricted or PRACH transmission itself is not carried out due to "CASE A", an operation may be implemented in which power ramping is suspended, due to the "ramping counter suspend notification", which is referred to at step S122 illustrated in FIG. 3, being issued from the PHY layer to the MAC layer.

Further, when transmitting a preamble with PRACH transmission power that is restricted or PRACH transmission itself is not performed due to "CASE A", the MAC layer may be notified of information indicating whether or not the PRACH transmission power is restricted so as to skip power ramping. For example, the PHY layer may notify the MAC layer of the information indicating whether or not the PRACH transmission power is restricted.

Furthermore, when transmitting a preamble with PRACH transmission power that is restricted or PRACH transmission itself is not performed due to "CASE A", the user equipment 200 may not increment the transmission counter by 1. The MAC layer may be notified of information not to increment the transmission counter by 1 from the PHY layer along with the "ramping counter suspend notification" or the MAC layer may be notified of "transmission counter suspend notification" from the PHY layer separately from the "ramping counter suspend notification."

Figure 5:
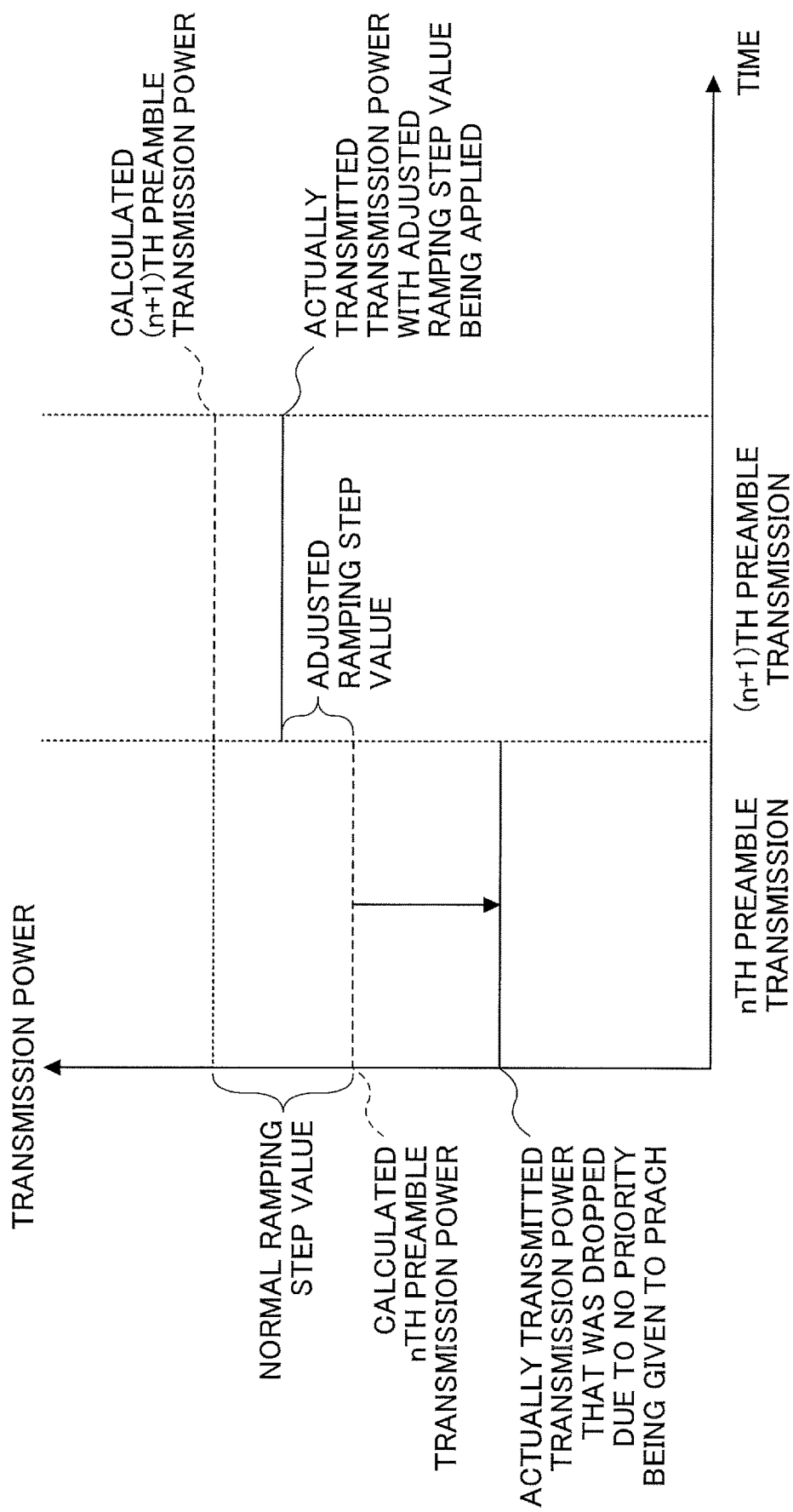
FIG. 5 is a diagram for illustrating Example (2) of preamble transmission power in an embodiment of the present invention.

FIG. 5 is a diagram for illustrating Example (2) of preamble transmission power in the embodiment of the present invention. When the user equipment 200 transmits a random access preamble with PRACH transmission power that is dropped or PRACH transmission itself is not performed due to "CASE A", the user equipment 200 may change a ramping step value associated with power ramping that is to be performed when retransmitting a random access preamble using PRACH.

As illustrated in FIG. 5, at the time of the nth preamble transmission, it is assumed that transmission power actually transmitted is dropped due to "CASE A" from transmission power calculated for the nth preamble transmission. Here, when the nth preamble transmission fails, the user equipment 200 may transmit a preamble at the (n+1)-th preamble transmission with transmission power to which an adjusted power ramping step value different from a normal power ramping step value is applied, as illustrated in FIG. 5.

For example, the user equipment 200 may be notified of the adjusted power ramping step value separately from the normal power ramping step value or the adjusted power ramping step value may be specified in advance. As the adjusted power ramping step value, a relative value based on the normal power ramping step value may be notified or specified. Furthermore, the adjusted power ramping step value to be notified or specified may be based on a value of power dropped due to PRACH transmission power restriction. For example, when PRACH transmission power has been dropped by X dB, the adjusted power ramping step value may be determined based on the value of X. For example, the larger the value of X, the smaller the adjusted power ramping step value may be, or the smaller the value of X, the larger the adjusted power ramping step value may be. Further, when PRACH transmission power has been dropped, and PRACH is sent at Y dBm, the adjusted power ramping step value may be determined based on the value of Y. For example, the smaller the value of Y, the smaller the adjusted power ramping step value may be, or the larger the value of Y, the larger the adjusted power ramping step value may be.

When the user equipment 200 transmits a random access preamble using PRACH with PRACH transmission power that is dropped due to "CASE A" and a transmission power value that is dropped and actually used in the transmission is smaller than a predetermined threshold value, the user equipment 200 need not ramp up power when retransmitting a random access preamble using PRACH or may change a ramping step value associated with power ramping. The threshold value applied to the transmission power that is a value actually used in the transmission may be specified by the absolute value of the power or the threshold value may be further adjusted based on a path-loss estimate value at the user equipment 200. For example, when the path-loss estimate value is large, a large threshold value may be used, and when the path-loss value is small, a small threshold value may be used.

Further, when the user equipment 200 transmits a random access preamble using PRACH with PRACH transmission power being dropped due to "CASE A" and the amount of the transmission power being dropped is larger than a predetermined threshold value, the user equipment 200 may not ramp up power when retransmitting a random access preamble using PRACH or may change a ramping step value associated with power ramping. The threshold value applied to the amount of the transmission power being dropped may be specified by a relative value of the power or the threshold value may be further adjusted based on a path-loss estimate value at the user equipment 200. For example, when the path-loss estimate value is large, a large threshold value may be used, and when the path-loss estimate value is small, a small threshold value may be used.

Further, when PRACH transmission power has been dropped due to "CASE A", the PHY layer of the user equipment 200 need not transmit a random access preamble using PRACH. The PHY layer may notify the MAC layer of information indicating that a random access preamble is not transmitted using PRACH.

Moreover, when PRACH transmission power is dropped due to "CASE A" and a transmission power value actually used in the transmission that is dropped is smaller than a predetermined threshold value, or the amount of transmission power dropped is larger than a predetermined threshold value, the PHY layer of the user equipment 200 need not transmit a random access preamble using PRACH.

When PRACH transmission power is restricted or not transmitted due to "CASE A", i.e., when using carrier aggregation, using two UL carriers with a single cell, or using a plurality of UL carriers such as in the case of dual connectivity, and a total of transmission power in a certain transmission period, such as that of PUSCH, PUCCH, PRACH, or SRS, exceeds the maximum transmission power of the user equipment 200 in the certain transmission period, and priority levels are assigned to the respective channel transmissions to prevent the total of transmission power from exceeding the maximum transmission power, the user equipment 200 can control random access preamble transmission power appropriately when performing a random access as a result of Examples as described above. Further, when PRACH transmission power is restricted or PRACH transmission itself is not performed due to "CASE A", the user equipment 200 can control random access preamble transmission power appropriately when performing a random access by not ramping up power. When PRACH transmission power is restricted or PRACH transmission itself is not performed due to "CASE A", the user equipment 200 can control random access preamble transmission power appropriately when performing a random access by adjusting a power ramping step value in accordance with a value used in restricting the PRACH transmission power.

That is, when the user equipment performs a random access, it is possible to set appropriate transmission power for a random access preamble.

(Device Configuration)

Next, an exemplary functional configuration of the base station apparatus 100 and the user equipment 200 that perform the processes and the operations as described thus far will be described. The base station apparatus 100 and the user equipment 200 include the functions for implementing the above-described examples. However, the base station apparatus 100 and the user equipment 200 each may have only a part of the functions described in the examples.

<Base Station Apparatus 100>

Figure 6:
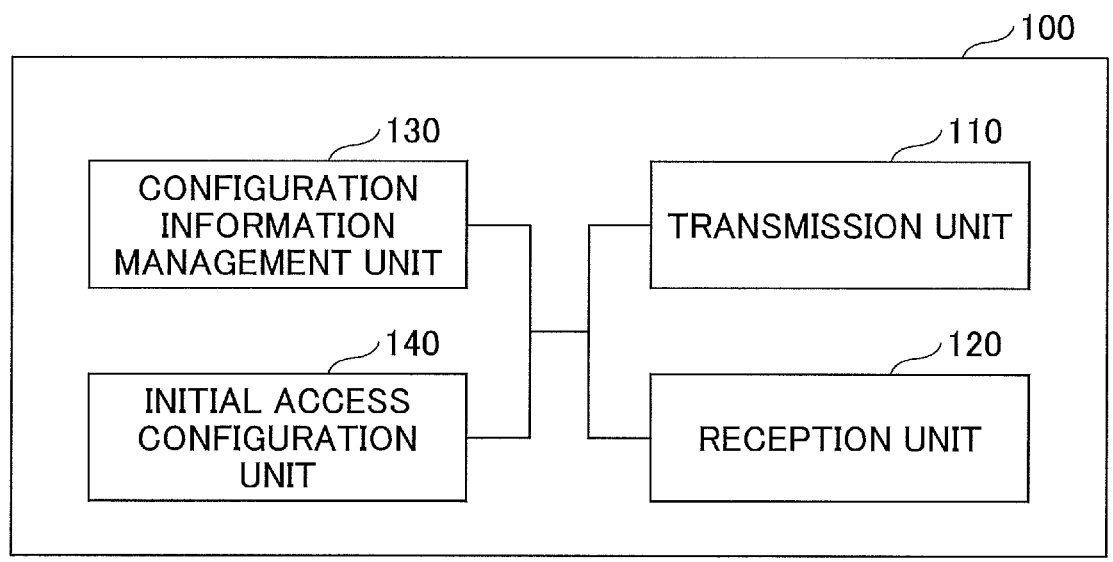
FIG. 6 is a diagram illustrating an exemplary configuration of a base station apparatus 100 in an embodiment of the present invention.

FIG. 6 is a diagram illustrating one example of a functional configuration of the base station apparatus 100. As illustrated in FIG. 6, the base station apparatus 100 has a transmission unit 110, a reception unit 120, a configuration information management unit 130, and an initial access configuration unit 140. It should be noted that the functional configuration shown in FIG. 6 is merely an example. Any functional division or any name may be used as long as the operations according to the embodiment of the present invention can be performed.

The transmission unit 110 includes a function of generating a signal to be sent to the user equipment 200 side and sending the signal wirelessly. The reception unit 120 includes a function of receiving a variety of signals sent from the user equipment 200 and obtaining from the received signals, for example, information on upper layers. Further, the transmission unit 110 has a function of sending to the user equipment 200 NR-PSS, NR-SSS, NR-PBCH, a DL/UL control signal or the like. Further, the transmission unit 110, for example, has a function of sending to the user equipment 200 UL scheduling or broadcast information including information used in an initial access, and the reception unit 120 has a function of receiving RACH preamble from the user equipment 200.

The configuration information management unit 130 stores preset configuration information and various types of configuration information to be sent to the user equipment 200. The contents of the configuration information include, for example, information on initial access transmission and reception parameters.

As described in connection with the example, the initial access configuration unit 140 sends to the user equipment 200 information used in an initial access and performs processes at the time of receiving a random access preamble sent from the user equipment 200 and transmission of a random access response.

<User Equipment 20>

Figure 7:
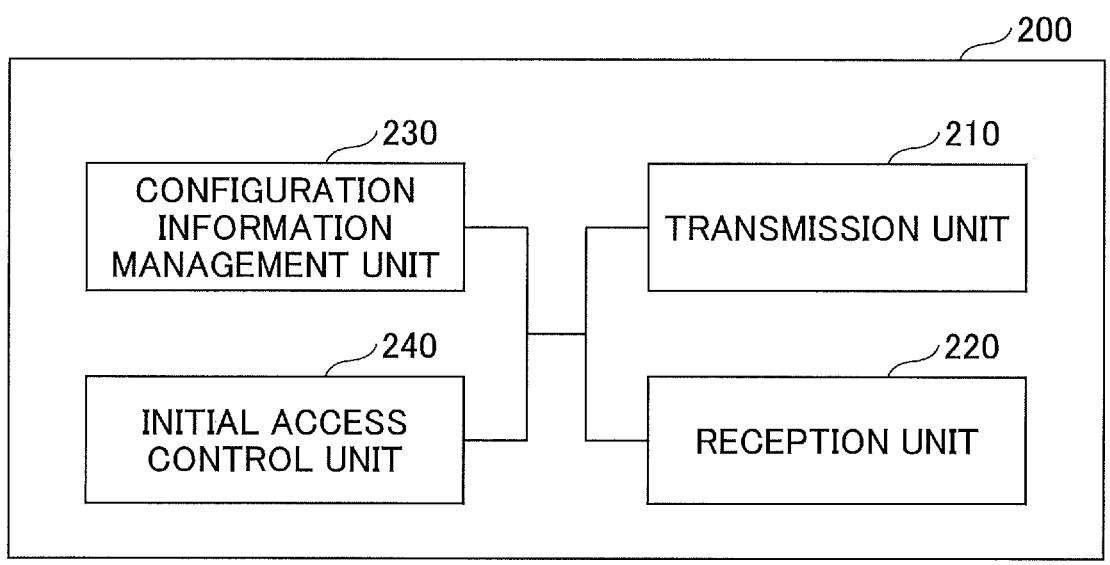
FIG. 7 is a diagram illustrating an exemplary configuration of a user equipment 200 in the embodiment of the present invention.

FIG. 7 is a diagram illustrating one example of the user equipment 200. As illustrated in FIG. 7, the user equipment 200 has a transmission unit 210, a reception unit 220, a configuration information management unit 230 and an initial access control unit 240. The functional configuration illustrated in FIG. 7 is merely an example. Any functional division or any name may be used as long as the operations according to the embodiment of the present invention can be performed.

The transmission unit 210 creates a transmission signal from transmission data and sends the transmission signal wirelessly. The reception unit 220 receives a variety of signals wirelessly and obtains signals of upper layers from the received physical layer signal. Further, the reception unit 220 has a function of receiving NR-PSS, NR-SSS, NR-PBCH, DL/UL control signal or the like sent from the base station apparatus 100. Further, the transmission unit 210 has a function of sending NR-PRACH, NR-PUSCH or the like to the base station apparatus 100.

The configuration information management unit 230 stores various types of configuration information received from the base station apparatus 100 or the user equipment 200 through the reception unit 220. Further, the configuration information management unit 230 stores preset configuration information. The contents of the configuration information include information on initial access transmission and reception parameters, for example.

As described in connection with the examples, the initial access control unit 240 generates a preamble and a message associated with an initial access that are sent to the base station apparatus 100 from the user equipment 200. Further, the initial access control unit 240 controls transmission power for a preamble associated with an initial access. A functional part of the initial access control unit 240 associated with signal transmission may be included in the transmission unit 210, and a functional part of the initial access control unit 240 associated with signal reception may be included in the reception unit 220.

<Hardware Configuration>

In the functional configuration diagrams (FIGS. 6 and 7) used in the description of the above embodiment, the blocks of the functional units are illustrated. The functional blocks (configuring units) are implemented by any combination of hardware and/or software. A device of implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

Figure 8:
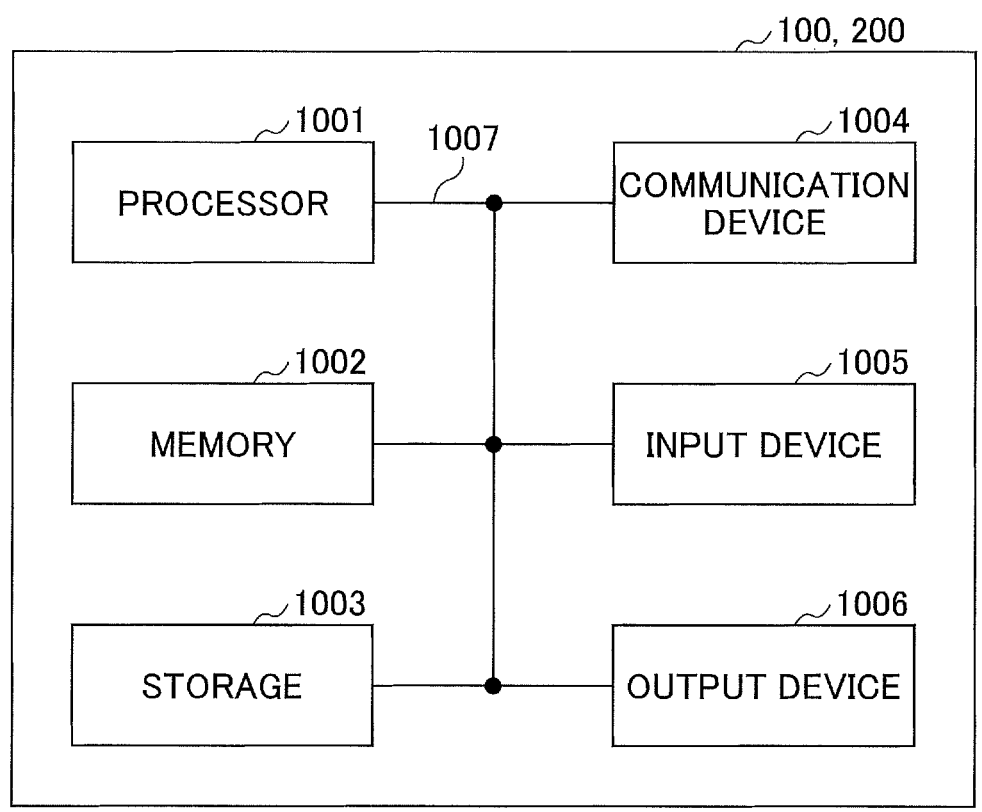
FIG. 8 is a diagram illustrating an exemplary hardware configuration of the base station apparatus 100 or the user equipment 200 in an embodiment of the present invention.

For example, each of the base station apparatus 100 and the user equipment 200 in the embodiment of the present invention may function as a computer that performs the process according to the embodiment of the present invention. FIG. 8 is a diagram illustrating an example of a hardware configuration of a communication device as the base station apparatus 100 or the user equipment 200 according to one embodiment of the present invention. Each of the base station apparatus 100 and the user equipment 200 described above may be physically configured as a computer device that includes a processor 1001, a memory 1002, a storage 1003, a communication device 1004, an input device 1005, an output device 1006, a bus 1007, and the like.

In the following description, the term "device" can be replaced with a circuit, a device, a unit, or the like. The hardware configuration of each of the base station apparatus 100 and the user equipment 200 may be configured to include one or more devices denoted by 1001 to 1006 illustrated in the drawing or may be configured without including some devices.

Each function in each of the base station apparatus 100 and the user equipment 200 is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like.

Further, the processor 1001 reads a program (a program code), a software module, and data from the storage 1003 and/or the communication device 1004 out to the memory 1002, and performs various kinds of processes according to them. A program causing a computer to execute at least some of the operations described in the above embodiment is used as the program. For example, the transmission unit 110, the reception unit 120, the configuration information management unit 130, and the initial access configuration unit 140 of the base station apparatus 100 shown in FIG. 6, for example, may be implemented by a control program which is stored in the memory 1002 and operates on the processor 1001. Further, the transmission unit 210, the reception unit 220, the configuration information management unit 230, and the initial access control unit 240 of the user equipment 200 shown in FIG. 7, for example, may be implemented by a control program which is stored in the memory 1002 and operates on the processor 1001. Various types of processes are described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), etc. The memory 1002 is also referred to as a "register," a "cache," a "main memory," or the like. The memory 1002 can store programs (program codes), software modules, or the like which are executable for carrying out the process according to an embodiment of the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transmitting and receiving device) for performing communication between computers via a wired and/or wireless network and is also referred to as a network device, a network controller, a network card, a communication module, or the like. For example, the transmission unit 110 and the reception unit 120 of the base station apparatus 1004 may be implemented by the communication device 1004. Further, the transmission unit 210 and the reception unit 220 of the user equipment 200 may be implemented by the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrated (for example, a touch panel).

The devices, such as the processor 1001 and the memory 1002, may be connected via the bus 1007 to communicate information with each other. The bus 1007 may be configured with a single bus or may be configured with different buses between the devices.

Further, each of the base station apparatus 100 and the user equipment 200 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these hardware components.

Conclusions of the Embodiments

As described above, according to the embodiments of the present invention, there is provided user equipment including a transmission unit that performs uplink transmissions to a base station apparatus via a plurality of uplink carriers; and a control unit that changes a transmission power value of a random access channel to be transmitted with one or more of the plurality of uplink carriers when priority levels are assigned to the respective uplink transmissions on the plurality of uplink carriers; wherein, when the transmission unit fails to transmit a random access preamble with the transmission power value of the random access channel that is changed by the control unit and the transmission unit retransmits a random access preamble, the control unit changes transmission power control of the random access preamble to be transmitted from normal transmission power control.

With the above-described configuration, when a plurality of UL carriers is used, such as a case of carrier aggregation, a case in which two UL carriers of a single cell is used, or a case of dual connectivity, and when transmission power of PRACH is restricted by assigning priority levels to transmissions of PUSCH, PUCCH, PRACH, SRS, etc., the user equipment 200 can appropriately control transmission power of a random access preamble to be transmitted when random access is performed. Namely, when user equipment performs random access, appropriate transmission power can be set to a random access preamble.

When a total of transmission power values on the plurality of uplink carriers exceeds a predetermined maximum power value, a transmission power value for a random access channel transmitted on any of the plurality of uplink carriers may be changed. With such a configuration, when using a plurality of UL carriers, such as a case of carrier aggregation, a case of using two UL carriers of a single cell, or a case of dual connectivity, and when transmission power of PRACH is restricted or PRACH is not transmitted in accordance with a case in which, when total transmission power in a transmission interval of PUSCH, PUCCH, PRACH, SRS, etc., exceeds the maximum transmission power of the user equipment 200 in the transmission interval, total transmission power is controlled so as not to exceed the maximum transmission power by assigning priority levels to transmissions on respective channels, the user equipment 200 can appropriately control transmission power of a random access preamble for performing random access. That is, the user equipment 200 can set appropriate transmission power for a random access preamble when performing a random access.

The control unit need not increase transmission power for the retransmitted random access preamble. With such a configuration, the user equipment 200 can control random access preamble transmission power appropriately when performing a random access by not ramping up power.

When transmission of a random access preamble with uplink transmission power that is changed by the control unit fails, a transmission counter for a random access preamble need not be incremented. With such a configuration, the user equipment 200 can control random access preamble transmission power appropriately when performing a random access by not ramping up power.

The control unit may use a power ramping step value different from a normal power ramping step value to determine a transmission power value for a retransmitted random access preamble. With such a configuration, the user equipment 200 can control transmission power of a random access preamble to be transmitted when performing random access by adjusting the power ramping step value in accordance with a value used in restricting the PRACH transmission power.

The different power ramping step value may be determined based on an extent of reduction of the transmission power value for a random access channel changed by the control unit or the reduced transmission power value. With such a configuration, the user equipment 200 can control transmission power of a random access preamble to be transmitted when performing random access by adjusting the power ramping step value in accordance with a value used in restricting the PRACH transmission power.

Furthermore, according to the embodiments of the present invention, there is provided a base station apparatus including a reception unit that receives, from user equipment, uplink transmissions via a respective plurality of carriers; a configuration unit that receives a random access preamble retransmitted from the user equipment when priority levels are assigned to respective uplink transmissions in the plurality of uplink carriers and the user equipment fails to transmit a random access preamble for which uplink transmission power of a random access channel is changed; and a transmission unit that transmits, to the user equipment, information indicating a power ramping step value that differs from a normal power ramping step value to be applied to the retransmitted random access preamble.

With the above-described configuration, when a plurality of UL carriers is used, such as a case of carrier aggregation, a case of using two UL carriers of a single cell, or a case of dual connectivity, and when transmission power of PRACH is restricted or PRACH is not transmitted as a result of assigning priority levels to transmissions of PUSCH, PUCCH, PRACH, SRS, etc., the user equipment 200 can appropriately control transmission power of a random access preamble that is to be transmitted when random access is performed.

Supplemental Embodiments

While embodiments of the invention have been described above, the disclosed inventions are not limited to the embodiments, but it could be understood by those skilled in the art that various modifications, corrections, alternatives, replacements, and the like can be made thereto. While specific numerical examples have been used to facilitate understanding of the invention, the numerical values are only an example and appropriate values may be used, unless otherwise specified. The sorting of articles in the above description is not essential to the invention, but details described in two or more articles may be combined for use if necessary, or details of a certain article may be applied to details described in another article (unless incompatible). The boundaries of the functional units or the processing units in the functional block diagrams cannot be said to correspond to boundaries of physical components. The operations of two or more functional units may be performed by a single physical component or the operation of a single functional unit may be performed by two or more physical components. The order of steps of the process procedure described in the present embodiment may be interchanged unless incompatible. For the sake of simplicity of the process description, the functional block diagrams have been used to describe the base station equipment and the user equipment. However, such devices may be implemented by hardware, software or a combination of hardware and software. Software operated by a processor included in the base station apparatus 100 according to the embodiment of the present invention and software operated by a processor included in the user equipment 200 according to the embodiment of the present invention may be stored in random access memory (RAM), flash memory, read only memory (ROM), EPROM, EEPROM, a register, hard disk drive (HDD), a removable disk, CD-ROM, database, server, or any other appropriate storage medium.

Notification of information is not limited to the aspects/embodiments described in this specification, but may be performed using other methods. For example, the notification of information may be performed physical layer signaling (such as downlink control information (DCI) or uplink control information (UCI)), upper layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing sequences, the sequences, the flowcharts and the like of the embodiment/examples described above in this specification may be changed in the order as long as they are not incompatible with each other. For example, in the method described in this specification, various steps as elements are described in an exemplary order and the method is not limited to the described order.

The certain operations described in the specification as being performed by the base station apparatus 100 may be performed by a upper node in some cases. In a network formed by one or more network nodes having the base station apparatus 100, it is clear that various operations performed for connection with the user equipment 200 could be performed by the base station apparatus 100 and/or a network node other than the base station apparatus 100. In the above, although a case of using one network node other than the base station apparatus 100 has been described as an example, a combination of a plurality other network nodes (e.g., MME and S-GW) may be used.

The aspects/embodiments described in this specification may be used alone, may be used in combination, or may be switched with implementation thereof.

The user equipment 200 may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station apparatus 100 may be referred to as an NodeB (NB), evolved NodeB (eNB), next generation NodeB (NE nodeB (gNB)), a base station or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "based on—" which is used in this specification does not refer to only "based only on—," unless apparently described. In other words, the expression "based on—" refers to both "based only on—" and "based on at least—."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

It should be noted that the initial access control unit 240 is one example of a control unit. The initial access configuration unit 140 is one example of a configuration unit. LTE is one example of the first RAT. NR is one example of the second RAT.

Although the present invention is described above in detail, it is obvious to those skilled in the art that the present invention is not limited to the embodiments described in this specification. The present invention can be implemented as modifications and alterations without departing from the gist and scope of the present invention defined in claims set forth below. Accordingly, the description of this specification is intended to be exemplary and does not have any restrictive meaning to the present invention.

LIST OF REFERENCE SYMBOLS

100 Base Station Apparatus
110 Transmission Unit
120 Reception Unit
130 Configuration Information Management Unit
140 Initial Access Configuration Unit
200 User Equipment
210 Transmission Unit
220 Reception Portion
230 Configuration Information Management Unit
240 Initial Access Control Unit
1001 Processor
1002 Memory
1003 Storage 1004 Communication Device
1005 Input Device
1006 Output Device

The invention claimed is:

1. A terminal in a communication system using multiple radio access technology (multi-RAT) dual connectivity, the terminal comprising:

a transmitter that performs uplink transmission including a random access channel via a plurality of uplink carriers comprising an uplink carrier in a primary cell group and an uplink carrier in a secondary cell group; and a processor that does not transmit in a random access channel on the uplink carrier in the secondary cell group upon detecting that a total of transmission power in the plurality of uplink carriers exceeds maximum transmission power, and reports, from a physical layer to a higher layer, information indicating that a counter used for power ramping on the random access channel that is not transmitted is suspended.

2. The terminal according to claim 1, wherein when the total of transmission power in the plurality of uplink carriers exceeds the maximum transmission power, the processor controls so that the random access channel on the uplink carrier having low priority among the random access channels on the plurality of uplink carriers is not transmitted.

3. The terminal according to claim 1, wherein when the total of transmission power in the plurality of uplink carriers exceeds the maximum transmission power, the processor controls, based on the priority of the plurality of uplink carriers, so that the random access channel on the uplink carrier other than a primary cell among the random access channels on the plurality of uplink carriers is not transmitted.

4. A terminal in a communication system using multiple radio access technology (multi-RAT) dual connectivity, the terminal comprising:

a transmitter that performs uplink transmission including a random access channel via a plurality of uplink carriers comprising an uplink carrier in a primary cell group and an uplink carrier in a secondary cell group; and a processor that reduces transmission power of the random access channel on the uplink carrier in the secondary cell group upon detecting that a total of transmission power in the plurality of uplink carriers exceeds maximum transmission power, and reports, from a physical layer to a higher layer, information indicating that a counter used for power ramping on the random access channel of which the transmission power is reduced is suspended.

5. The terminal according to claim 4, wherein when the total of transmission power in the plurality of uplink carriers exceeds the maximum transmission power, the processor controls so that the transmission power of the random access channel on the uplink carrier having low priority among the random access channels on the plurality of uplink carriers is reduced.

6. The terminal according to claim 4, wherein when the total of transmission power in the plurality of uplink carriers exceeds the maximum transmission power, the processor controls, based on the priority of the plurality of uplink carriers, so that the transmission power of the random access channel on the uplink carrier other than a primary cell among the random access channels on the plurality of uplink carriers is reduced.

7. A wireless communication method performed by a terminal in a communication system using multiple radio access technology (multi-RAT) dual connectivity, the method comprising:

performing uplink transmission including a random access channel via a plurality of uplink carriers comprising an uplink carrier in a primary cell group and an uplink carrier in a secondary cell group; and not transmitting in a random access channel on the uplink carrier in the secondary cell group upon detecting that a total of transmission power in the plurality of uplink carriers exceeds maximum transmission power, and reporting, from a physical layer to a higher layer, transmission information indicating that a counter used for power ramping on the random access channel that is not transmitted is suspended.

* * * * *